United States Patent [19]

Nakata et al.

[11] Patent Number: 4,804,710

[45] Date of Patent: Feb. 14, 1989

[54] EPOXY RESIN COMPOSITION

[75] Inventors: Yoshihiro Nakata, Takatsuki; Tadao Kunishige, Kusatsu, both of Japan

[73] Assignee: Sunstar Giken Kabushiki Kaisha, Osaka, Japan

[21] Appl. No.: 139,810

[22] Filed: Dec. 30, 1987

[51] Int. Cl.$^4$ .............................................. C08L 63/00
[52] U.S. Cl. ..................................... 525/111; 525/113
[58] Field of Search ..................... 525/111, 112, 113; 528/393

[56] References Cited

U.S. PATENT DOCUMENTS 4,130,546  12/1978  Goto et al. ............................ 525/111

FOREIGN PATENT DOCUMENTS 072001  1/1986  Japan .................................. 525/111

OTHER PUBLICATIONS

Handbook of Epoxy Resin, pp. 10-1-10-23, H. Lee and K. Neville, McGraw-Hill Book Co., 1982 Reissue.

*Primary Examiner*—John C. Bleutge
*Assistant Examiner*—Annabel Y. Lee
*Attorney, Agent, or Firm*—Wegner & Bretschneider

[57] ABSTRACT

A two part epoxy composition which comprises
(1) a specific modified epoxy resin component comprising
  (a) an epoxy resin,
  (b) an epoxy resin modified with a butadiene-acrylonitrile copolymer rubber, and
  (c) a urethane-modified epoxy resin obtained by reacting an isocyanate-terminated urethane prepolymer obtained from a polytetramethylene ether glycol and a diisocyanate with an epoxy resin containing at least one hydroxy group in the molecule, and
(2) a curing agent comprising a polyamide-amine, said epoxy resin composition having excellent knife-cutting property and being useful as an adhesive or a coating agent.

4 Claims, No Drawings

EPOXY RESIN COMPOSITION

This invention relates to an improved epoxy resin composition, more particularly to a two part epoxy resin composition containing a specific modified epoxy resin and a curing agent, which can give a cured product having excellent knife-cutting property, that is, a squeezed out part, which is produced when the composition is applied to as an adhesive or a coating agent, can easily be cut off with a knife.

TECHNICAL BACKGROUND

Epoxy resins have excellent mechanical properties, electrical properties, chemical resistance, etc. and further have excellent adhesion to various materials, and hence, have widely been used as an adhesive or a coating agent. For instance, epoxy resins have excellent adhesion to fiber glass reinforced plastics (abbreviated as "FRP") and are useful as an adhesive for FRP-made parts. However, when these epoxy resin adhesives are used, they must usually be temporarily cured by heating, where the squeezed out adhesive should be cut off by sanding or with knife, and because the cured epoxy resin is too hard and brittle, it is hardly cut off with knife.

OBJECT OF THE INVENTION

The present inventors have intensively studied to obtain an improved epoxy resin composition which has excellent property in the cutting of the squeezed out part of the composition, and have found that when an epoxy resin modified with a specific rubber component is incorporated into the composition and further a polyamide-amine is used as a curing agent, the knife-cutting of the cured product becomes easier without affecting on the adhesion strength of the composition.

An object of the invention is to provide an improved two part epoxy resin composition which can give a cured product having improved knife-cutting property. Another object of the invention is to provide a two part epoxy resin composition containing a specific modified poxy resin and a specific curing agent. These and other objects and advantages of the invention will be apparent to those skilled in the art from the following description.

DETAILED DESCRIPTION OF THE INVENTION

The two part epoxy resin composition of this invention comprises
(1) a specific modified epoxy resin component comprising
  (a) an epoxy resin,
  (b) an epoxy resin modified with a butadieneacrylonitrile copolymer rubber (hereinafter, referred to as "BA rubber"), said modified epoxy resin being hereinafter referred to as "BA rubber-modified epoxy resin", and
  (c) a urethane-modified epoxy resin obtained by reacting an isocyanate-terminated urethane prepolymer obtained from a polytetramethylene ether glycol and a diisocyanate with an epoxy resin containing at least one hydroxy group in the molecule, and
(2) a curing agent comprising a polyamide-amine.

The epoxy resin (a) includes any conventional epoxy resins, such as glycidyl ether type epoxy resins, glycidyl ester type epoxy resins, glycidyl amine type epoxy resins, linear aliphatic epoxide type epoxy resins, alicyclic epoxide type epoxy resins, and the like, which are used alone or in combination of two or more thereof. Particularly preferred epoxy resin is the glycidyl ether type epoxy resins, for example, reaction products of a polyhydric phenol and epichlorohydrin (e.g. diglycidyl ether of bisphenol A (=2,2-bis(4-hydroxyphenyl)propane), etc.), reaction products of a polyhydric phenol alkylene oxide adduct and epichlorohydrin (e.g. diglycidyl ether of bisphenol A ethylene oxide (and/or propylene oxide) adduct, etc.), reaction products of an aliphatic polyhydric alcohol and epichlorohydrin (e.g. glycerin triglycidyl ether, 1,6-hexanediol diglycidyl ether, etc.), hydrogenated products of a reaction product of a polyhydric phenol or its alkylene oxide adduct with epichlorohydrin (e.g. hydrogenated bisphenol A polyglycidyl ether, etc.), and the like. Particularly suitable epoxy resin is the polyhydric phenol derivatives, such as bisphenol A diglycidyl ether.

The BA rubber-modified epoxy resin (b) is produced by reacting the conventional epoxy resin as mentioned above with a BA rubber having a carboxyl group. The BA rubber having a carboxyl group includes various commercially available products, such as Hicar CTBN 1300×8, 1300×9, 1300×13 or 1300×15 (manufactured by B.F. Goodrich Co.). The reaction ratio of the epoxy resin and the BA rubber is in the range of 1/0.5 to 1/2.0 by weight (epoxy resin/BA rubber). The reaction is usually carried out at a temperature of 120° to 150° C. for 3 to 8 hours.

The BA rubber-modified epoxy resin (b) is usually incorporated into the composition in an amount of 20 to 200 parts by weight, preferably 30 to 80 parts by weight, per 100 parts by weight of the epoxy resin (a). When the amount of the BA rubber-modified epoxy resin (b) is less than 20 parts by weight, the resulting eooxy resin composition does not show the desired improvement of the knife-cutting property of the cured product, and on the other hand, when the amount is over 200 parts by weight, the epoxy resin composition shows disadvantageously inferior adhesion strength.

The urethane-modified epoxy resin (c) used in this invention is usually produced by reacting a polytetramethylene ether glycol with an excess amount of a diisocyanate to obtain a urethane prepolymer having a free isocyanate group at the terminus (hereinafter, referred to as "NCO-terminated prepolymer") and then reacting the NCO-terminated prepolymer with an epoxy resin containing at least one hydroxy group in one molecule (hereinafter, referred to as "OH-epoxy resin").

The polytetramethylene ether glycol has a molecular weight of 500 to 5,000, preferably 1,000 to 2,500.

The diisocyanate includes, for example, tolylene diisocyanate, diphenylmethane diisocyanate, naphthalene diisocyanate, isophorone diisocyanate, hexamethylene diisocyanate, and the like. Particularly preferred diisocyanate is tolylene diisocyanate and diphenylmethane diisocyanate.

The reaction of the polytetramethylene ether glycol and the diisocyanate is usually carried out under nitrogen gas atmosphere at a temperature of 60° to 120° C. for 1 to 6 hours by using the reactants in a ratio of the isocyanate group of the latter to the hydroxy group of the former in the range of 1.2 to 3 equivalents [i.e. NCO-/OH =1.2–3 equivalents].

The reaction of the NCO-terminated prepolymer and the OH-epoxy resin (e.g. bisphenol A diglycidyl ether, aliphatic polyhydric alcohol diglycidyl ether, etc.) is usually carried out at a temperature of 80° to 110° C. until the reaction of hydroxy group and isocyanate group is completed, wherein the reactants are used in a ratio of the hydroxy group of the latter to the isocyanate group of the former in the range of equivalent or more, preferably 2 to 5 equivalents [i.e. OH/-NCO=equivalent or more, preferably 2 to 5 equivalent].

The urethane-modified epoxy resin (c) thus obtained is incorporated into the composition in an amount of 20 to 200 parts by weight, preferably 30 to 80 parts by weight, per 100 parts by weight of the epoxy resin (a). When the amount of the urethane-modified epoxy resin is less than 20 parts by weight, the resulting epoxy resin composition does not show the desired improvement of knife-cutting property, and on the other hand, when the amount is over 200 parts by weight, the composition tends to show lower adhesion strength.

The polyamide-amine used as the curing agent is a product obtained by reacting a dimer acid (e.g. polymeric fatty acids produced by dimerizing fatty acids such as tall oil, etc.) with an aliphatic polyamine (e.g. diethylene triamine, etc.), as disclosed in "Secchaku Binran" (Handbook of Adhesives), 13th Ed., August 1983, issued by Kobunshi Kanko Kai. The polyamide-amine has preferably an amine value of 300 to 600. The amount of the curing agent may vary depending on the amine value of the polyamide-amine, for example, when the polyamide-amine has an amine value of 300, the curing agent is used in an amount of 40 to 100 parts by weight, preferably 50 to 80 parts by weight, per 100 parts of the specific modified epoxy resin component (1) [components (a)+(b)+(c)]. Besides, when the polyamideamine has an amine value of 600, the amount of the curing agent is in the range of 30 to 50 parts by weight per 100 parts by weight of the specific modified epoxy resin component (1). When the curing agent is used in an amount out of the above range, the desired curing effect can not be achieved. The polyamide-amine may be used together with an appropriate amount of other amines, such as an aliphatic polyamines (e.g. diethylene triamine, etc.), alicyclic polyamines (e.g. isophoronediamine, etc.), aromatic polyamines (e.g. m-phenylenediamine, etc.), amine adducts (e.g. diethylene triamine bisphenol A adduct, etc.), and the like.

The specific modified epoxy resin component used as the main component of the two part epoxy resin composition of this invention can be prepared by mixing the components (a) to (c), which is mixed with the curing agent when used. Optionally, the main component may be mixed with other conventional additives, such as fillers (e.g. calcium carbonate, clay, silica, talc, carbon black, metal powder, etc.), anticorrosion pigments (e.g. phosphates, zinc chromate, etc.), plasticizers, solvents, and the like.

This invention is illustrated by the following Preparation, Examples and Reference Examples, but should not be construed to be limited thereto.

Preparation 1

Preparation of urethane-modified epoxy resin

A polytetramethylene ether glycol (molecular weight 1000) (100 parts by weight) and tolylene diisocyanate (35 parts by weight) are mixed in a flask which is purged with nitrogen gas. After exothermal reaction is finished, the mixture is heated up to 80° C. and stirred for 3 hours to give an NCO-terminated prepolymer.

To the prepolymer (45 parts by weight) is added bisphenol A diglycidyl ether (Epikote 828, manufactured by Yuka Shell Epoxy K.K., epoxy equivalent: 215, hydroxy equivalent: 900) (250 parts by weight), and the mixture is stirred at 95° C. for 7 hours to give a urethane-modified epoxy resin having an epoxy equivalent of 260.

EXAMPLES 1–3 and REFERENCE EXAMPLES 1–3

The components as shown in Table 1 are mixed in the amounts shown in said table to give epoxy resin compositions.

The compositions were subjected to knife-cutting test as mentioned below. The results are also shown in Table 1.

Knife-cutting test

The above epoxy resin compositions were each applied to one face of FRP plate, and thereon was piled another FRP plate, where the resin layer had a thickness of 0.5–1.0 mm. The piled plates were heated at 80° C. for 30 minutes to cure the resin composition. The squeezed out resin composition thus cured was cut off with a knife, and thereby the knife-cutting property (easiness of cutting) was evaluated as follows:

o: It was easily cut off with a knife

Δ: Although it could be cut off with a knife, the resin layer was broken or cleaved because the cure resin was brittle.

x: It was difficult to cut with a knife.

TABLE 1

|  | Example No. | | | Ref. Example No. | | |
| --- | --- | --- | --- | --- | --- | --- |
|  | 1 | 2 | 3 | 1 | 2 | 3 |
| Epikote 828 (part by weight) | 100 | 100 | 100 | 100 | 100 | 100 |
| BA rubber-modified epoxy resin*1 (part by weight) | 70 | 50 | 40 | 100 | — | — |
| Urethane-modified epoxy resin prepared in Preparation 1 (part by weight) | 30 | 50 | 60 | — | 100 | — |
| Calcium carbonate (part by weight) | 100 | 100 | 100 | 100 | 100 | 100 |
| Polyamidamide*2 (part by weight) | 100 | 100 | 100 | 100 | 100 | 100 |
| Calcium carbonate (part by weight) | 100 | 100 | 100 | 100 | 100 | 100 |
| Knife-cutting property | o | o | o | Δ | x | x |

[Notes]:
*1 It is a product produced by reacting Epikote 828 with a BA rubber containing a carboxyl group (Hicar CTBN 1300 × 8, manufactured by B. F. Goodrich Co.) in a ratio of 1/1 by weight at 120° C. for 5 hours.
*2 Tomide 230A, manufactured by Fuji Kasei Kogyo, K.K.

What is claimed is:

1. A two part epoxy resin composition which comprises
   (1) a specific modified epoxy resin component comprising
      (a) 100 parts by weight of an epoxy resin,
      (b) 20 to 200 parts by weight of an epoxy resin modified with a butadiene-acrylonitrile copolymer rubber, and
      (c) 20 to 200 parts by weight of a urethane-modified epoxy resin obtained by reacting an isocyanate-terminated urethane prepolymer obtained from a polytetramethylene ether glycol and a diisocyanate with an epoxy resin containing at least one hydroxy group in the molecule, and (2) a curing agent comprising a polyamide-amine.

2. The composition according to claim 1, wherein the amount of the compounds (b) and (c) is each in the range of 30 to 80 parts by weight per 100 parts by weight of the component (a).

3. The compositon according to claim 1, wherein the curing agent (2) comprising a polyamide-amine having an amine value of 300 is used in an amount of 40 to 100 parts by weight per 100 parts by weight of the specific modified epoxy resin component (1).

4. The composition according to claim 1, werein the curing agent (2) comprising a polyamide-amine having an amine value of 600 is used in an amount of 30 to 50 parts by weight per 100 parts by weight of the specific modified epoxy resin component (1).

* * * * *